US United States Patent Office 3,231,590
Patented Jan. 25, 1966

3,231,590
N$^\epsilon$-(6,8-DICHLOROOCTANOYL)-L-LYSINE
Hiroshi Hirano, Shinjukuku, Tokyo, and Toyokazu Kishi, Nishinomiya, Japan, assignors to Takeda Pharmaceutical Industries, Ltd., Osaka, Japan
No Drawing. Filed Dec. 27, 1960, Ser. No. 78,255
Claims priority, application Japan, Dec. 28, 1959, 34/41,123
1 Claim. (Cl. 260—404.5)

This invention relates to 6,8-dihalooctamide compounds. The compounds of this invention can easily be converted into α-lipoamide compounds which are useful for medicinal purposes.

A hitherto known method for the preparation of a α-lipoamide compounds pertains to convert α-lipoylchloride produced from sodium lipoate into its acid amide compounds with the aid of ammonia or amino compounds (see e.g. A. F. Wagner et al., Journal of the American Chemical Society, vol. 78 (1956), p. 5079). This process, however, requires the use of α-lipolychloride, which is a considerably unstable compound, and therefore not only are there considerable difficulties in the preparation of the starting material but also the yield of the amide compounds obtained is low. Thus, the known process can not always be regarded as an industrially advantageous one.

Attempts have been made by the present inventors and co-workers to establish a novel process free from such shortcoming, and they have developed a process for synthesizing α-lipoamide compounds through novel intermediates, 6,8-dihalooctamide compounds. The intermediates are all stable compounds and are easily convertible into α-lipoamide compounds in a higher yield. This invention relates to such intermediate compounds. Namely, the object of this invention is to offer new compounds to be employed for industrial synthesis of α-lipoamide compounds.

The compounds of this invention are generally representable by the formula

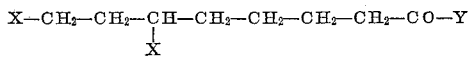

wherein Y is an amino group or a residue of an essential amino acid at its amino group, and the X's are respectively halogen atoms. The amino acid residue may, for example, be 1 - carboxy - 3 - methyl - mercaptopropylamino group (methionine residue), carboxymethylamino group (glycine residue), 1-carboxy-2-methylpropylamino group (valine residue), 1 - carboxy - 3 - methylbutylamino group (leucine residue), 1 - carboxy - 2 - methylbutylamino group (isoleucine residue), 1 - carboxy - 2 - hydroxypropylamino group (threonine residue), 5-amino-5-carboxypentylamino group (lysine residue), 1-carboxy-5-amino-pentylamino group (lysine residue), 1-carboxy-2 - phenylethylamino group (phenylalanine residue) and 1 - carboxy - 2 - imidazolylethylamino group (histidine residue).

One of the compounds of this invention may be prepared by, for example, the reaction between a reactive derivative of 6,8-dihalooctanoic acid at its carboxyl group and ammonia or an essential amino acid. The reactive derivative at the carboxyl group of 6,8-dihalooctanoic acid may, for example, be acid halide, ester, acid anhydride, mixed acid anhydride with another organic or inorganic acid and condensation product of 6,8-dihalooctanoic acid and a halocarbonic acid ester. That is, the starting material of this reaction can be represented by the formula

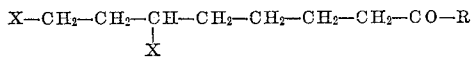

wherein R is a halogen atom such as chlorine and bromine, an alkoxyl radical such as methoxy and ethoxy radicals, an acyloxy radical such as acetoxy, benzoxy and lipoyloxy radicals, an alkoxycarbonyl radical such as ethoxycarbonyloxy and butoxycarbonyloxy radicals, a dihalogenophosphinyloxy radical such as dichlorophosphinyloxy radical or an alkoxyphosphinyloxy radical such as dimethoxy-, diethoxyphosphinyloxy radicals and the X's are respectively halogen atoms. These compounds can, for example, be synthesized by per se known processes from 6,8-dihalooctanoic acid (Acker and Wayne: Journal of the American Chemical Society, vol. 79 (1957), p. 6,483), although most of these compounds are novel compounds. For example, the acid halide is produced by halogenation of the carboxyl radical of 6,8-dihalooctanoic acid, the acid ester by an esterification of the carboxyl radical, the acid anhydride by a condensation reaction between 6,8-dihalooctanoic acid and the same or a different organic acid or phosphorus oxychloride or its alkoxy derivatives and the condensation product by a dehydrohalogenation between 6,8-dihalooctanoic acid and a halocarbonic acid ester.

Another reactant in the process is ammonia or an essential amino acid. The amino acid may, for example, be glycine, arginine, histidine, isoleucine, leucine, lysine, methionine, phenylalanine, threonine, tryptophane and valine, including their derivatives such as esters, salts and acyl derivatives.

The reaction between the above two reactants may be effected in a suitable solvent in accordance with the character of the two reactants. Briefly stated, the solvent may be one of those which dissolve both reactants or in which both reactants can well be brought into contact with each other. The solvent may, for example, be water, methanol, ethanol, diethyl ether, di-normalbutyl ether, acetone, tetrahydrofuran, carbon tetrachloride, chloroform, dioxane, benzene and pyridine. These solvents may, if necessary, be used as a mixed solvent.

In certain cases, the reaction requires a dehydrohalogenating agent such as organic and inorganic basic substances. As the basic substances are counted organic amines such as triethylamine, diphenylamine, pyridine and quinoline, alkali hydroxide such as sodium hydroxide, and silver oxide. These dehydrohalogenating agents are added, if necessary, to the reaction mixture to make the reaction proceed smoothly.

The reaction between the two reactants can generally be brought about at room temperature or with ice cooling and it requires no heating in most cases. But, to make the reaction complete, the reactants mixture may be subjected to heating.

Some of the products are hardly soluble in the solvent employed, so that they deposit in the reaction mixture and can be collected by filtration or by centrifugation. If the product is present in the reaction mixture as solution, it is convenient to collect the product by the concentration of the reaction mixture or by extraction with a suitable solvent. The product thus recovered is in most cases in relatively crude state, and therefore the product is purified through a conventional manner, if necessary. The purification may be effected by recrystallization from a suitable solvent such as water, carbon tetrachloride, alcohol, ethylacetate and their mixture. When the product is liquid, it is liable to be decomposed by distillation in most cases, and therefore it is hardly purified, but the product can be purified by repeated extraction with a solvent.

The mode of the recovery and purification will be shown more concretely in the working examples.

The compounds of this invention can, as briefly stated in the opening, be employed for synthesizing α-lipoamide compounds. The course to the α-lipoamide compounds from the compound of this invention is, for example, as follows:

An alkali metal disulfide or ammonium disulfide is allowed to react with one of the compounds of this invention in a suitable solvent. The former reactants can be represented by the formula of $M_2S_2$, wherein M stands for ammonium radical or an alkali metal atom such as sodium and potassium atoms. The solvent is selected, so as to dissolve both reactants, from among water, methanol, ethanol, dioxane, pyridine, etc. and their mixtures. Although the reaction proceeds even at room temperature, the reactants mixture may in general be heated to proceed the reaction rather smoothly. By this reaction two moles of alkali metal halide or ammonium halide are eliminated from one each mole of the reactants, whereby an α-lipoamide compound whose structure is representable by the formula below is produced.

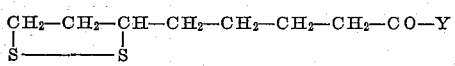

(Y stands for an amino group or an essential amino acid residue at its amino group.)

α-Lipoamide compounds thus produced are widely usable for medicinal purposes as one of the derivatives of α-lipoic acid. The α-lipoamide works as a co-enzyme in oxidative decarboxylation of α-ketoglutaric acid, and its activity is about three times as strong as that of α-lipoic acid. From this, the α-lipoamide compounds derivable from the product of this invention can be utilized as a medicament for a disturbance of liver function.

The following specific examples of this invention are intended to be illustrative only and not to limit the invention in spirit or in scope. In these examples, percent is in weight percent unless otherwise noted, and the relationship between part by weight and part by volume is the same as that between gram and milliliter.

*Example 1*

To a solution of 20 parts by weight of methyl 6,8-dichlorooctanoate in 300 parts by volume of methanol is added 300 parts by weight of concentrated (ca. 30%) aqueous ammonia. After being agitated for 7 hours, the mixture is allowed to stand for 4 days at room temperature. Upon concentrating the mixture, colorless crystals are separated. The crystals are washed with concentrated aqueous ammonia, then are recrystallized from carbon tetrachloride or from water to obtain 13 parts by weight of 6,8-dichlorooctamide, M.P. 82° C.

A mixture composed of 6 parts by weight of sodium sulfide nonahydrate, 0.8 part by weight of sulfur and 100 parts by volume of 95% ethanol is refluxed in a nitrogen atmosphere to make the mixture a solution, whereby an ethanolic solution of sodium disulfide is prepared. While refluxing this solution, a solution of 4.4 parts by weight of 6,8-dichlorooctamide obtained as above in 50 parts by volume of ethanol is added dropwise during several hours. Further refluxing is carried out for 1 more hour. The reaction mixture is cooled, and 100 parts by volume of water is added thereto. Most of the ethanol is distilled off from the mixture, then the pH thereof is adjusted to 7.6 with normal hydrochloric acid. The solution is extracted several times with chloroform, and the chloroform solution is washed and dried over anhydrous sodium sulfate. Concentration of the solution under reduced pressure gives yellow crystals. The product is recrystallized from carbon tetrachloride, whereupon α-lipoamide, M.P. 122° C., is obtained as yellow crystals. No depression of melting point is observed, when the product is melted with an authentic specimen of α-lipoamide.

*Example 2*

Into a concentrated (ca. 30%) aqueous ammonia is added dropwise 6.5 parts by weight of 6,8-dichlorooctanoyl chloride under agitation, whereupon colorless crystals are deposited. After being kept standing for several hours, the crystalline mass is filtered up, washed with water, and then recrystallized from carbon tetrachloride to obtain 5.5 parts by weight of 6,8-dichlorooctamide, M.P. 82° C.

Together with 50 parts by volume of 95% ethanol are refluxed on a water bath 2.2 parts by weight of sodium sulfide nonahydrate and 0.3 part by weight of sulfur in a nitrogen atmosphere. After the components are dissolved, 25 parts by volume of an ethanolic solution of 2 parts by weight of afore-obtained 6,8-dichlorooctamide is added, and refluxing is continued for further several hours. After cooling, 50 parts by volume of water is added. Concentration of the mixture is carried out below 30° C. under reduced pressure, whereupon yellow crystals are gradually separated out. After the separation is complete, the crystals are filtered, dried, and recrystallized from carbon tetrachloride to obtain 1.2 parts by weight of α-lipoamide, M.P. 122° C. The product is identical with that of Example 1.

*Example 3*

Into a solution of 5 parts by weight of 6,8-dichlorooctanoyl chloride in 100 parts by volume of benzene is passed gaseous ammonia. After being left standing overnight, the mixture is shaken with concentrated (ca. 30%) aqueous ammonia. The benzene layer is washed with water, dried, then concentrated under reduced pressure. To the residue is added 100 parts by volume of the concentrated aqueous ammonia to separate crystals. After being washed with water, the product is recrystallized from carbon tetrachloride to obtain 6,8-dichlorooctamide, M.P. 82° C. The product can be converted into α-lipoamide through the manner described in Examples 1 and 2.

*Example 4*

To a solution composed of 7.2 parts by weight of ethyl ester of DL-methionine and 4 parts by weight of triethylamine in 100 parts by volume of benzene is gradually added a solution of 8.8 parts by weight of 6,8-dichlorooctanoyl chloride in 50 parts by volume of benzene. The mixture is warmed for 30 minutes on a water bath, whereupon needle-like crystals, triethylamine hydrochloride, are separated, which are washed with benzene. The filtrate is combined with the washings and washed twice with 150 parts by volume portions of half a normal hydrochloric acid. After drying over calcium chloride, the benzene solution is concentrated to obtain 9.5 parts by weight of ethyl ester of N-(6,8-dichlorooctanoyl)-DL-methionine as liquid substance.

To 150 parts by volume of 99% ethanol are added 7.2 parts by weight of sodium sulfide nonahydrate and 0.96 part by weight of sulfur. The mixture is refluxed in a nitrogen atmosphere to make an ethanolic solution of sodium disulfide. To this solution while being refluxed a solution of 7 parts by weight of ethyl ester of N-(6,8-dichlorooctanoyl)-DL-methionine in 70 parts by volume of 99% ethanol is added dropwise. Further reflux is carried out for 4 hours, and the solution is cooled. The separated mass is removed, and the solution is concentrated. A solution of the residue in 100 parts by volume of water is washed with ethyl acetate. After being weakly acidified with normal hydrochloric acid, the aqueous solution is extracted with chloroform several times. After being washed with water, the chloroform solution is dried over anhydrous sodium sulfate. The residue obtained by the concentration of the solution under reduced pressure is kept standing to obtain crystals. Recrystallization of the product from di-normalbutyl ether gives 2.2 parts by weight of N-(α-lipoyl)-DL-methionine in pale yellow crystals, M.P. 85–90° C.

*Analysis.*—Calcd. for $C_{13}H_{23}O_3NS_3$: N, 4.15%. Found: N, 4.01%.

*Example 5*

To a solution of 10.7 parts by weight of 6,8-dichlorooctanoyl acid in 5 parts by weight of triethylamine and 200 parts by volume of anhydrous acetone is added dropwise 6.8 parts by weight of butyl chlorocarbonate during 30 minutes at −5° C. under agitation. The separated needle-like crystals of triethylamine hydrochloride are removed by filtration to obtain a solution containing 6,8-dichlorooctanoic normalbutoxycarbonic anhydride. Gaseous ammonia is passed through the filtrate, and the solution is concentrated under reduced pressure. The residual liquid is poured into 200 parts by volume of a concentrated (ca. 30%) aqueous ammonia to form crystalline mass. The mass is recrystallized from carbon tetrachloride to obtain 7.5 parts by weight of 6,8-dichlorooctamide, M.P. 82° C.

The product can be converted into α-lipoamide after the manner of the preceding Examples 1 and 2.

*Example 6*

To a mixture composed of 8.5 parts by weight of 6,8-dichlorooctanoic acid, 4 parts by weight of triethylamine and 100 parts by volume of tetrahydrofuran is added dropwise at −5° C. a mixture of 7.7 parts by weight of 2-ethyl-normalhexyl chlorocarbonate and 40 parts by volume of tetrahydrofuran. After the separated triethylamine hydrochloride is removed by filtration, the filtrate is added under agitation to a mixture composed of 7.2 parts by weight of chelated compound of L-lysine with copper, 100 parts by volume of water and 50 parts by volume of tetrahydrofuran. After being allowed standing overnight, the mass separated from the mixture is washed with water, then is suspended in 200 parts by volume of 50% ethanol. The suspension is saturated with hydrogen sulfide, and filtered under warming. The filtrate separates crystals on cooling. Recrystallization from water of the product gives 7.8 parts by weight of $N^\epsilon$-(6,8-dichlorooctanoyl)-L-lysine in colorless crystals, M.P. 208° C. (decomposition).

*Analysis.*—Calcd. for $C_{14}H_{26}Cl_2O_3N_2$: C, 49.27%; H, 7.62%; N, 8.21%. Found: C, 49.61%; H, 7.65%; N, 8.22%.

A mixture composed of 1.2 parts by weight of sodium sulfide nonahydrate, 0.15 part by weight of sulfur and 50 parts by volume of 50% ethanol is refluxed to make an ethanolic solution of sodium disulfide. To the ethanolic solution, a mixture of 1.7 parts by weight of the aforeobtained $N^\epsilon$-(6,8-dichlorooctanoyl)-L-lysine and 300 parts by volume of 50% ethanol is added. The mixture is refluxed for 7 hours on a water bath and concentrated under reduced pressure. When left standing in a refrigerator, the mixture separates pale yellow crystals. The product is recrystallized from 50% ethanol to obtain 0.7 part by weight of $N^\epsilon$-(α-lipoyl)-L-lysine in pale yellow crystals, M.P. 228° C.

*Analysis.*—Calcd. for $C_{14}H_{26}O_3N_2S_2$: C, 50.30%; H, 7.78%; N, 8.38%. Found: C, 49.91%; H, 7.48%; N, 8.21%.

Having thus disclosed the invention, what is claimed is:
$N^\epsilon$-(6,8-dichlorooctanoyl)-L-lysine.

References Cited by the Examiner
UNITED STATES PATENTS

| | | | |
|---|---|---|---|
| 2,463,779 | 5/1949 | Kester | 260—404 |
| 2,980,716 | 4/1961 | Reed | 260—408 |

FOREIGN PATENTS

| | | |
|---|---|---|
| 59,294 | 5/1913 | Austria. |

CHARLES B. PARKER, *Primary Examiner.*

ABRAHAM H. WINKELSTEIN, DANIEL D. HORWITZ, ALTON H. SUTTO, *Assistant Examiners.*